Patented Mar. 22, 1932

1,850,757

UNITED STATES PATENT OFFICE

STANLEY ISAAC LEVY, OF LONDON, ENGLAND

SEPARATION OF LEAD FROM SOLUTIONS

No Drawing. Application filed February 25, 1928, Serial No. 257,093, and in Great Britain February 10, 1928.

This invention relates to the separation of lead from solutions containing high concentrations of a soluble chloride e. g. from the ferrous chloride solutions obtained by treating with hydrochloric acid the mainly soluble residue derived from iron pyrites by heating in the absence of air, or by treating iron pyrites with chlorine gas.

In the treatment of the "mainly soluble" residue of iron pyrites with hydrochloric acid, I obtain concentrated solutions of ferrous chloride containing practically the whole of the lead present in the original mineral. The normal solubility of lead chloride in water at ordinary temperature, 15° C. corresponds to about 6.8 gr. of lead per litre. By the processes described in the specifications of my applications Serial Nos. 259,317 and 257,095, filed respectively March 5, 1928, and February 25, 1928, I obtain amounts of lead in the solutions as high as 15 gr. per litre. It is impossible to separate lead from these solutions by ordinary chemical methods; metallic iron does not cause separation directly, nor is any precipitate obtained with sulphuric acid or hydrogen sulphide.

In accordance with the present invention, I displace the lead electro-chemically from the ferrous chloride solution by means of metallic iron.

According to one method of effecting this electro-chemical displacement, I subject the solution to electrolysis, employing a very low voltage only, one half to one volt being sufficient. The cathode is a metal plate, on which the lead is deposited in a spongy condition. The spongy lead is removed periodically and compressed to free it from adherent solution. The anode may be of carbon or other inert material, and may be immersed in a solution of sodium, calcium, magnesium or other similar chloride contained in a porous vessel, in which case chloride is evolved and may be liquefied or converted into bleaching powder etc., in known manner. The anode may, however, be an iron plate, in which case a quantity of iron, equivalent to the lead deposited and to the small amount of hydrogen formed at the cathode, is taken into the solution. The lead may be sold directly as crude metal, or melted up and refined in the usual way. The recovery of lead is very high, and amounts to 80–90% of that present in the original pyrites.

I may also effect the separation of the lead electro-chemically by means of an iron copper couple, prepared by leaving iron filings in contact with a solution of copper sulphate for a few moments. The filings after washing are shaken with the iron lead chloride solution at a temperature somewhat above the normal; any temperature up to the boiling point may be employed, but 50–60° C. is suitable. Under these conditions, the lead is deposited by the electro-chemical action of the couple, the equivalent quantity of iron going into the solution. The quantity of filings used is chosen as somewhat more than that theoretically required. When the action is complete, the lead associated with the excess of iron, and the small quantity of copper present in the couple, is removed by filtration or otherwise, washed, pressed and refined by any suitable method.

The methods of separating lead from solutions described may be applied also to other solutions of lead chloride containing high concentrations of a soluble chloride, e. g. to solutions of lead chloride in saturated common salt solutions, such as are obtained in the leaching of lead-containing materials with hot brine solutions, whether neutral or containing hydrochloric acid.

The lead is deposited in a spongy form if the solution is kept cold, and the E. M. F. and current density low. I may however use hot solutions and higher E. M. F. and current density, when I obtain the lead in a coherent sheet form.

I claim:

1. The method of recovering lead from soluble residues obtained from the treatment of pyrites which comprises treating such soluble residues with hydrochloric acid, thereby obtaining a chloride solution containing such a high concentration of ferrous chloride as to inhibit the ordinary reactions of lead in solution, and displacing the lead electrochemically from the solution by means of metallic iron.

2. The method of recovering lead from soluble residues obtained from the treatment of pyrites which comprises treating such soluble residues with hydrochloric acid, thereby obtaining a chloride solution containing such a high concentration of ferrous chloride as to inhibit the ordinary reactions of lead in solution, and causing iron to displace the lead electrochemically by passing a current between iron electrodes immersed in the solution, using an E. M. F. less than that required to decompose ferrous chloride.

3. The method of recovering lead from soluble residues obtained from the treatment of pyrites which comprises treating such soluble residues with hydrochloric acid, thereby obtaining a chloride solution containing such a high concentration or ferrous chloride as to inhibit the ordinary reactions of lead in solution, and displacing the lead electrochemically by passing a current between an iron anode and a metal cathode immersed in the solution to deposit lead on the cathode, and using an E. M. F. less than that required to decompose the ferrous chloride.

4. The method of recovering lead from soluble residues obtained from the treatment of pyrites which comprises treating such soluble residues with hydrochloric acid, thereby obtaining a chloride solution containing such a high concentration of ferrous chloride as to inhibit the ordinary reactions of lead in solution, and displacing the lead electrochemically by passing a current between iron electrodes immersed in the solution, keeping the solution cold and using an E. M. F. of not more than about one volt.

5. The method of recovering lead from soluble residues obtained from the treatment of pyrites which comprises treating such soluble residues with hydrochloric acid, thereby obtaining a chloride solution containing such a high concentration of ferrous chloride as to inhibit the ordinary reactions of lead in solution, and displacing the lead electrochemically by passing a current between iron electrodes immersed in the solution, keeping the solution hot and using a high current density and an E. M. F. insufficient to decompose the ferrous chloride.

6. The method of recovering lead from soluble residues obtained from the treatment of pyrites which comprises treating such soluble residues with hydrochloric acid, thereby obtaining a chloride solution containing such a high concentration of ferrous chloride as to inhibit the ordinary reactions of lead in solution, and, displacing the lead electrochemically by the action of a couple of which one element is iron.

In testimony whereof I have signed my name.

STANLEY ISAAC LEVY.